United States Patent [19]
Garberg

[11] Patent Number: 5,211,261
[45] Date of Patent: May 18, 1993

[54] LUBRICATION DEVICE FOR A PIVOT JOINT

[75] Inventor: Bryan J. Garberg, Moorhead, Minn.

[73] Assignee: Case Corporation, Racine, Wis.

[21] Appl. No.: 807,995

[22] Filed: Dec. 16, 1991

[51] Int. Cl.⁵ .............................................. F16C 1/24
[52] U.S. Cl. .................................. 184/5.1; 384/147;
384/400; 403/35; 403/38
[58] Field of Search ................. 403/158, 162, 131, 35,
403/38; 464/7, 138, 158; 184/5, 5.1, 6.27, 100;
384/147, 400

[56] References Cited
U.S. PATENT DOCUMENTS

| | | | |
|---|---|---|---|
| 1,504,749 | 8/1924 | Eckart | 464/7 |
| 1,576,089 | 3/1926 | Burns | 464/7 |
| 1,839,602 | 1/1932 | Shakely | 464/7 |
| 2,737,791 | 3/1956 | Dillman et al. | 464/7 |
| 4,679,957 | 7/1987 | Bauer | 403/131 |

FOREIGN PATENT DOCUMENTS
1154049 4/1958 France .................................. 403/131

Primary Examiner—Ira S. Lazarus
Assistant Examiner—Alan B. Cariaso
Attorney, Agent, or Firm—Jansson & Shupe, Ltd.

[57] ABSTRACT

The invention is a ring-like lubrication device used in a pivot joint of the type connecting two members such as on an articulated agricultural tractor or wheeled loader. Such joint has a joint pin and a bearing permitting relative oscillating and articulating movement of the members one to the other. The device includes a hollow, annular reservoir-like chamber which holds lubricant for the joint/bearing sliding surfaces. The device also seals the joint to obstruct the entry of dirt. In a highly preferred arrangement, a device is mounted at the top and bottom of a joint for lubrication and obstruction of dirt entry. The device is configured and arranged to accommodate oscillating and articulating movement between the joined members.

12 Claims, 6 Drawing Sheets

PRIOR ART

LUBRICATION DEVICE FOR A PIVOT JOINT

FIELD OF THE INVENTION

This invention relates generally to lubrication devices and, more particularly, to an improved lubrication device particularly useful with pivot joints of articulated, off-highway mobile machines such as agriculture tractors.

BACKGROUND OF THE INVENTION

Certain types and sizes of mobile machines, e.g., large rubber-tired, off-highway construction loaders, agricultural tractors and the like, include frames or sections capable of limited movement with respect to one another. This capability makes the machine much more maneuverable. Such frames are connected by one or more hinges, sometimes called pivot joints, permitting such movement and machines so constructed are said to be "articulated." In the vernacular, they bend in the middle.

The frames or sections of such machines are at least capable of relative movement in a single plane as would occur when the machine is articulated on a flat surface. Such frames are also capable of oscillatory movement one with respect to the other; that is, the frames can "twist" to a limited extent with respect to one another. Such twisting motion occurs when the machine moves over undulating terrain.

Machines of the foregoing type frequently operate under dirty conditions. Airborne dust, mud particles, grain chaff and the like collect on the machine and one place where such contaminants accumulate is on oily, greasy surfaces including those of the pivot joints. As a consequence, such joints are prone to accelerated wear. The machine manufacturer typically provides an external grease fitting (sometimes called a "zerk" fitting) at such joints for periodic joint greasing by the machine operator using, e.g., a hand-operated grease gun. These grease fittings are very similar to those used to lubricate the chassis of an automobile.

Such conventional joint arrangements are characterized by at least two disadvantages. On is that for continuing joint lubrication and reasonable joint life (particularly in dirty operating environments—the usual case), the joint must be lubricated frequently, e.g., every ten hours or so of operation. Experience has demonstrated that many machine users simply fail to follow the manufacturer's instructions in this regard.

Another disadvantage is that the lubricant channels (through the zerk fitting and connecting passages into the joint) often become packed with a mixture of dirt and grease. Such mixture hardens and is difficult to remove—mere application of pressurized lubricant from a grease gun may well be insufficient to dislodge it. As a result, the machine operator may believe that s/he is effectively lubricating the joint when, in fact, no fresh lubricant is being introduced to the vital sliding friction surfaces. Premature joint wear and failure result.

An improved pivot joint lubrication device which accommodates oscillating and articulating movement, which is readily filled with lubricant and which lubricates vital pivot joint parts while obstructing entry of dust and dirt into the joint would be an important advance in the art.

OBJECTS OF THE INVENTION

It is an object of the invention to overcome some of the problems and shortcomings of the prior art including but not limited to those mentioned above.

Another object of the invention is to provide an improved lubrication device which helps assure continuing joint lubrication.

Still another object of the invention is to provide such an improved device which accommodates oscillating and articulating movement.

Yet another object of the invention is to provide an improved lubrication device which obstructs entry of dirt into the joint.

Yet another object of the invention is to provide such a device which scrapes dirt from certain joint surfaces.

Another object of the invention is to provide an improved device which is readily filled with lubricant.

Still another object of the invention is to provide an improved pivot joint lubrication device which obviates the need for frequent manual lubrication of the joint. How these and other objects are accomplished will become apparent from the following detailed description taken in conjunction with the drawing.

SUMMARY OF THE INVENTION

The improved lubrication device is particularly useful with mobile machinery, e.g., an agricultural tractor, having front and rear frames and a joint coupling member extending from each frame. A pivot joint connects such members in hinge fashion. Typically, the first member has parallel, spaced upper and lower extensions defining a slot between them. A single "tongue" or tongue-like second member fits between the extensions with clearance. A joint pin couples the extensions and the tongue, joining them together. The joint also has a primary bearing concentric with the pin and having a spherical surface permitting relative oscillating and articulating movement of the members one to the other.

The tongue-like member includes a cavity configured as a cylindrical hole through the member. Confined in the cavity is a joint assembly comprised of the primary bearing and an outer race. Such bearing and race define an "interface," i.e., the area where the bearing and race substantially contact one another and, desirably, are separated only by a thin film of grease. The outer race (and, consequently, the primary bearing) are confined in the cavity by a pair of annular disc-shaped retaining plates, each of which has an outer face.

In a joint of the foregoing type, lubricant is injected through an external fitting and along a passage to a bearing race. The race has a circumferential grease groove connected to a hole extending to the interface. Assuming a clean, dust-free environment, grease is injected into the foregoing path to lubricate the interface.

In the improvement, a pivot joint lubrication device has a secondary bearing with a spherical surface in motion-accommodating sealing engagement with the device. The device also has a lubricant flow path extending toward the spherical surface of the primary bearing whereby such surface is lubricated and entry of dirt to the surface is obstructed. The device includes a panel perforated by several holes and a cover mating with but spaced from the panel to form a reservoir-like chamber in which lubricant is placed. Mounting is by a retaining ring positioned between the cover and the panel. The ring is secured by bolts through holes in the lower panel and the holes are substantially larger than the bolts.

Such ring secures the panel with slight clearance between the panel and the ring. The device is mounted in sliding relationship to an outer face of a retaining plate and the ring-panel clearance and the enlarged holes accommodate oscillating movement of the machine frames. The ring-panel clearance also permits slight panel movement away from the face, thereby enabling lubricant to flow between the device and the interface. The ring-panel clearance creates a path through which lubricant can flow in either of two directions, i.e., from the device to the interface (as the joint is continually being lubricated) or from the interface to the device as the chamber is filled or replenished with lubricant.

When the improved lubrication device is installed on a joint, it is contiguous with an annulus partially defined by the device. The annulus is in a lubricant-transferring relationship to the interface so that lubricant confined in the annulus lubricates the interface. And as lubricant is depleted from the annulus, it is replenished from the chamber.

A lubricant injection path—through which the chamber is filled with lubricant—includes the path described above as to a known joint. In a joint using the inventive device, the path also includes the annulus and the clearance space. Additionally, the device cover includes an auxiliary fill port whereby lubricant may be placed into the chamber.

The device also includes a resilient scraper seal around its outer perimeter. When the device is installed on a joint, such seal is in sliding contact with an outer face of a retaining plate. During oscillatory motion of the machine frames, the seal wipes or "scrapes" dirt off of the plate.

Further details regarding the device are set forth in the detailed descriptions taken in conjunction with the drawing.

DESCRIPTION OF THE DRAWING

FIG. 3 is a representative cross-sectional rear elevation view showing the relative positions of two lubrication devices with respect to the hinge-like joint members connecting machine frames. In FIG. 3, the frame members are shown as they would be in the absence of oscillating motion. Parts are shown in full representation and others are broken away.

DETAILED DESCRIPTION OF PREFERRED EMBODIMENTS

Figure 5:
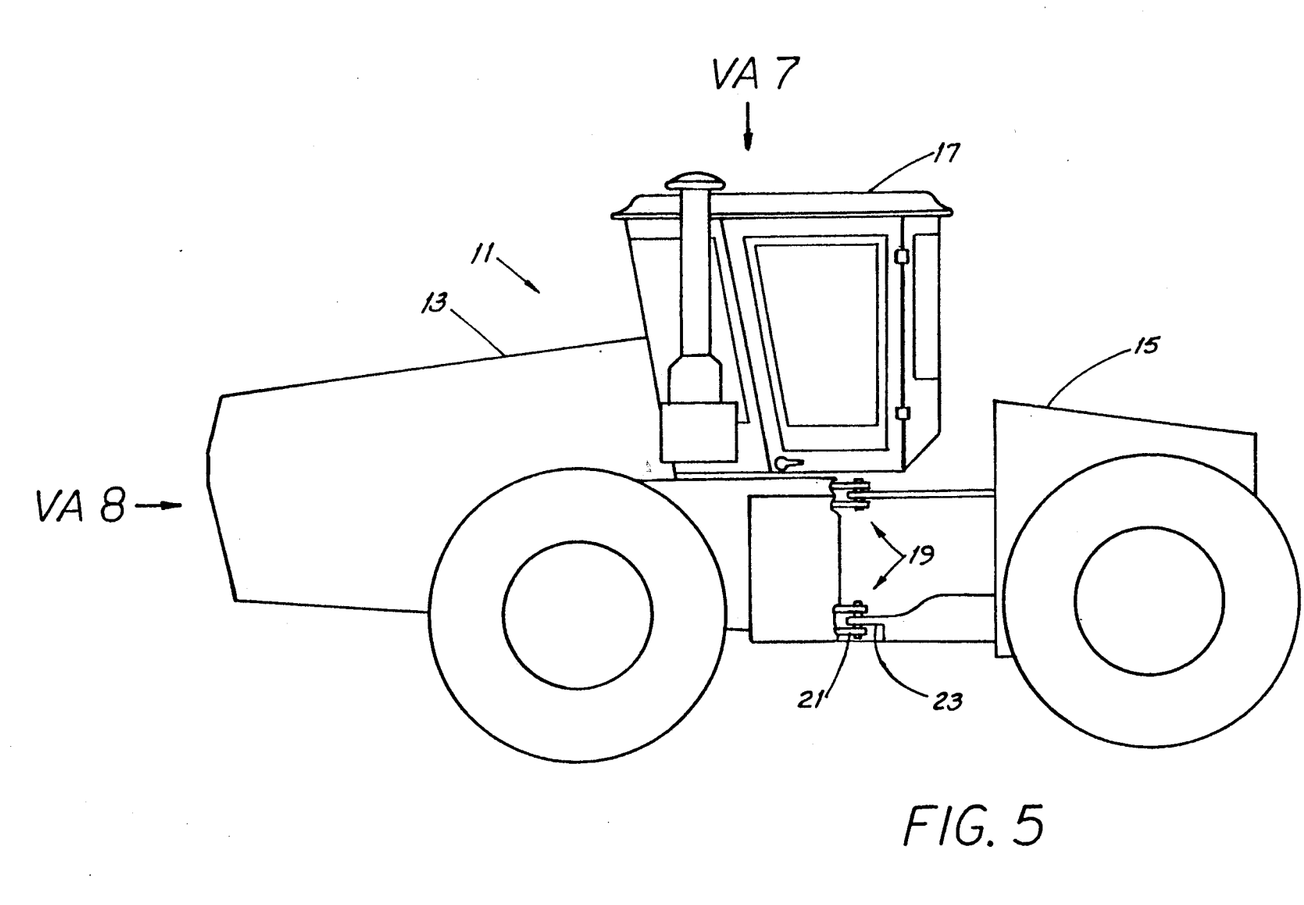
FIG. 5 is a simplified side elevation view, with parts broken away, of a large, articulated agricultural tractor on which the invention is suitable for use.

Before describing the inventive pivot joint structure 10, it will be helpful to understand aspects of a typical machine and conventional machine pivot joint on which the structure 10 could be used. Referring to FIG. 5, a machine embodied as a large rubber-tired agricultural tractor 11 includes a front frame 13 housing the engine, a rear frame 15 and an operator's cab 17. The frames 13, 15 are connected together by a pair of hinges—or pivot joints 19 as they are sometimes called—which permit the frames 13, 15 to articulate or "swing" laterally with respect to one another. Such pivot joints 19 also permit oscillating, twisting motion of the frames 13, 15 with respect to one another. The tractor 11 illustrated in FIG. 5 is of the Model 9270/9280 series made by Case Corporation of Racine, Wis.

Figure 6:
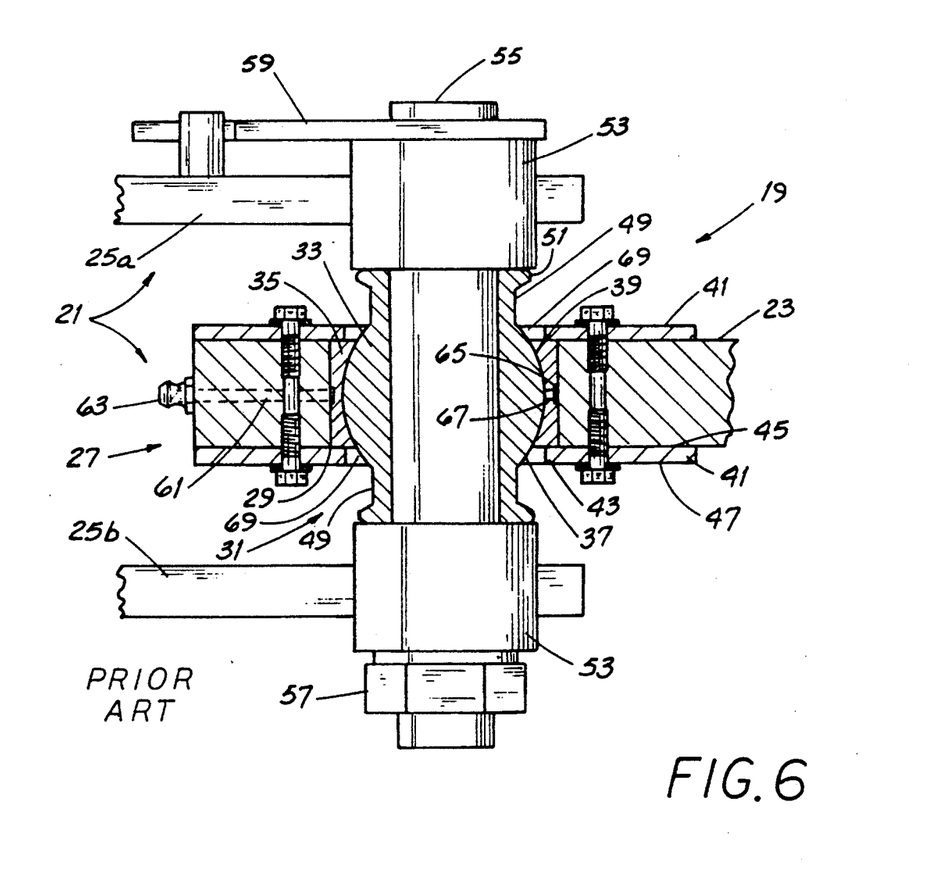
FIG. 6 is a side elevation view, partly in cross-section and with parts broken away, showing a known type of pivot joint. Parts are shown in full representation and others are broken away.

Referring additionally to FIG. 6, each frame 13, 15 has an attachment member 21, 23, respectively, extending toward the other frame 15, 13, respectively. The first attachment member 21 has parallel, spaced upper and lower extensions 25a, 25b defining a slot 27 between them. A single tongue-like second member 23 extends from the other frame 15 and fits between the extensions 25a, 25b with clearance. In large machines, such extensions 25a, 25b and members 21, 23 are fabricated of steel plates that may be on the order of one inch thick. Such members 21, 23 are required to be very strong to withstand the rigors of machine operation.

The member 23 includes a cavity 29 configured as a cylindrical hole through it. A joint assembly 31 is received in the cavity 29 and has a primary bearing 33 and an outer race 35. The inner surface of the outer race 35 is conformably shaped to the spherical surface 37 of the bearing 33 to permit articulating and oscillating motion. The bearing 33 and race 35 define an interface 39 i.e., the area where the bearing 33 and the race 35 substantially contact one another and are separated only by a thin film of grease. The terms "spherical" and "spherical surface" are used herein even though the surface or surfaces referred to (e.g., surface 37) are truncated, rather than complete, spheres.

The race 35 and bearing 33 are confined in the cavity 29 by a pair of annular, disk-shaped retaining plates 41. Each plate 41 is bolted to the member 23 and has an inner perimeter 43 which slightly overlaps the outer race 35 for secure race and bearing retention. Each plate 41 has an inward face 45 in contact with the member 23 and an exposed outer face 47.

The primary bearing 33 is interposed between a pair of sleeves 49, each of which has a flared end 51. The extensions 25a, 25b include mounting bosses 53 spaced to accept the member 23 and the sleeves 49 with slight clearance. Each boss 53 has a hole through it for receiving a coupling pin 55 secured by a nut 57. The pin 55 is prevented from rotation by an arm 59 secured to an extension 25a.

The member 23 includes a passage 61 extending from a zerk grease fitting 63 radially inward to a circumferential grease channel 65 in the outer race 35. The outer race 35 has a radial passage 67 extending to the interface 39 and grease injected into the zerk fitting 63 propagates inward through the passages 61, 67, across the interface 39 and emerges at the open spaces 69 above and below the interface 39. The grease in the spaces 69 is exposed to ambient airborne contaminants.

With this type of conventional joint configuration, one can readily understand how the joint 19 can become packed with dust and other contaminants which adhere to the grease and the fitting 63. The contaminant-laden grease often becomes hard and caked so that it is difficult or impossible to properly grease the joint 19. And contaminants migrate into the interface 39 and cause premature wear.

Figure 1:
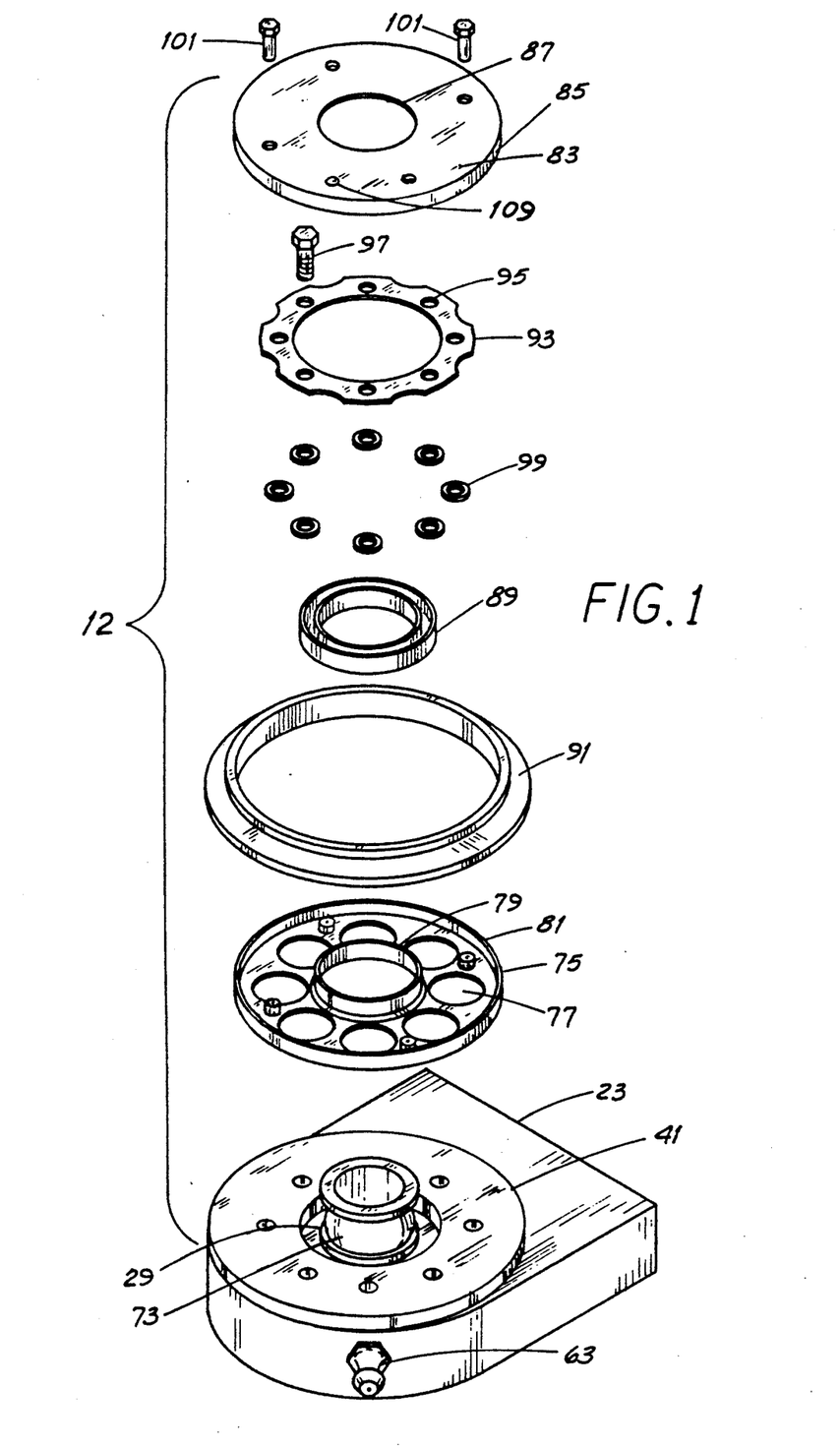
FIG. 1 is an exploded perspective view of the new lubrication device shown in conjunction with a joint attaching member.
Figure 2A:
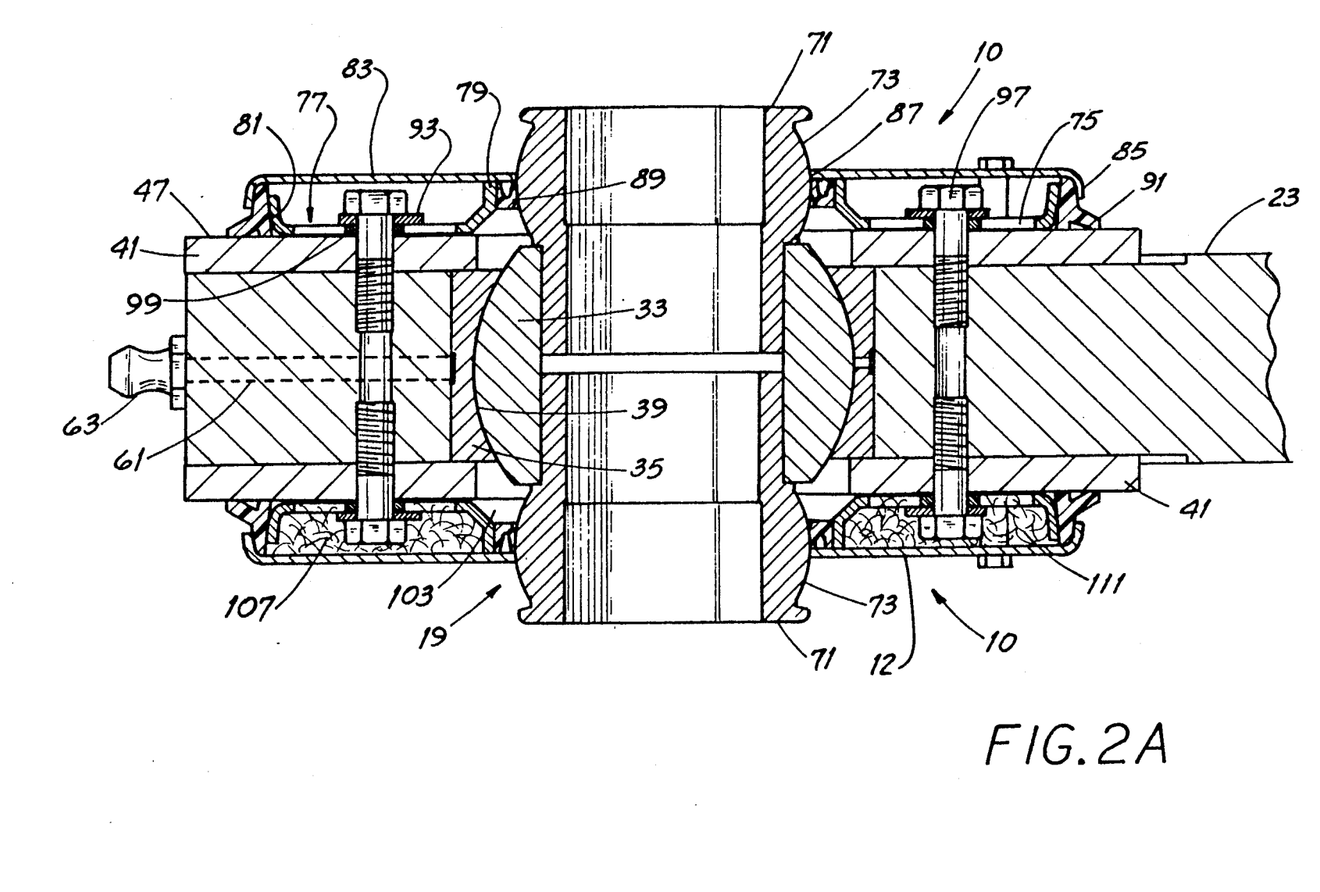
FIG. 2A is a cross-sectional side elevation view of a joint fitted with two assembled lubrication devices like that shown in FIG. 1, with parts broken away and other parts shown in dashed outline.
Figure 2B:
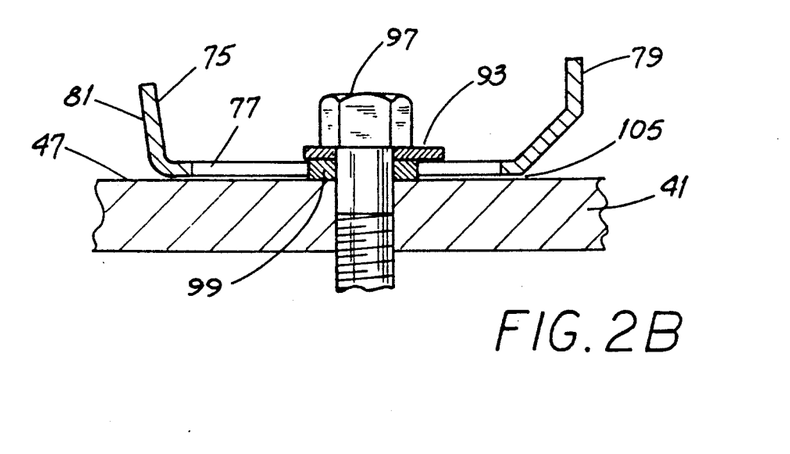
FIG. 2B is is a cross-sectional side elevation view, enlarged, of a portion of the structure shown in FIG. 2A with parts broken away.
Figure 3:
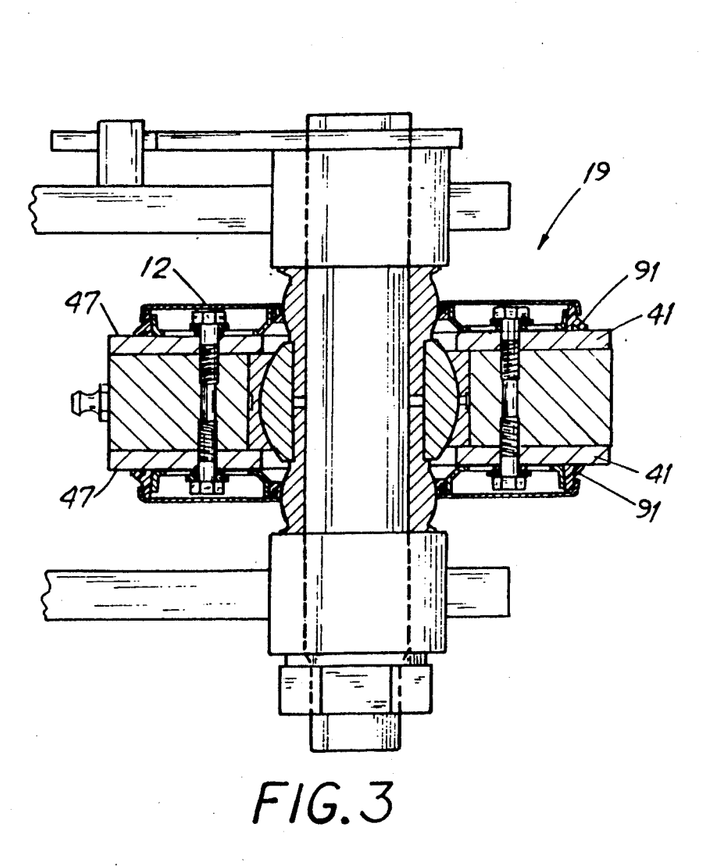
Figure 4:
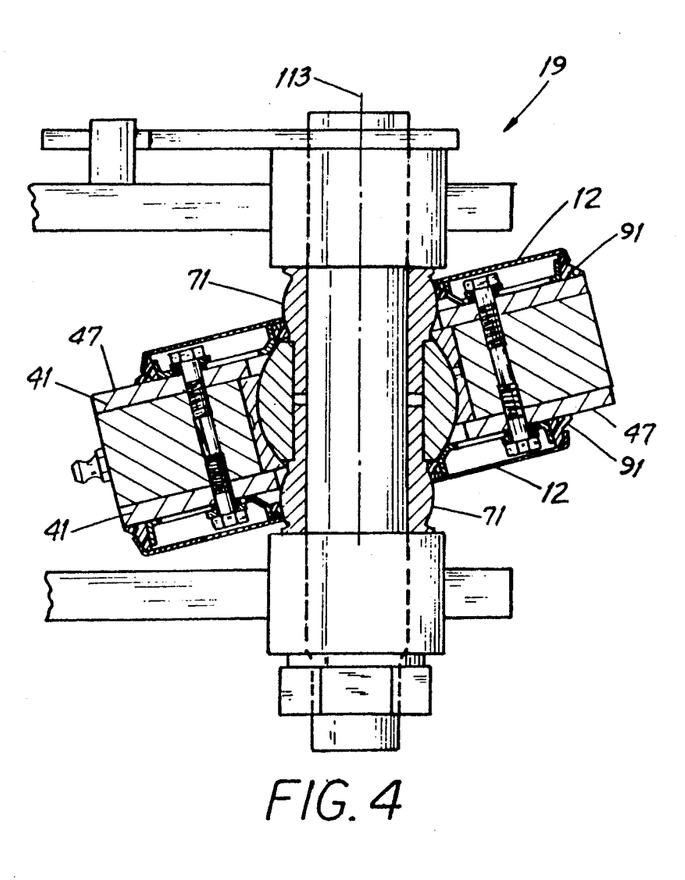
FIG. 4 is a representative cross-sectional rear elevation view similar to that of FIG. 3 but showing the frame members during oscillating motion.

Turning now to the invention, the improved lubrication device 12 solves these difficult lubrication problems in a unique way. Referring to FIGS. 1, 2A and 2B, the improved lubrication device 12 is mounted in sealing, motion-accomodating relationship to a secondary bearing 71. As shown in FIGS. 2A, 3 and 4 the joint 19 includes two such bearings 71 and the primary bearing 33 is interposed therebetween. Each such bearing 71 has a spherical surface 73 sealing with the device 12. Such device 10 is described below in connection with the upper device 10 shown in FIGS. 1 and 2A.

The device 12 is a ring-like structure and includes an annular lower panel 75 with several enlarged holes 77 formed in it and upwardly-turned inner and outer edges, 79, 81, respectively. The device 12 also includes an annular cover 83 having a downwardly turned outer edge 85 and a circular inner edge 87, the diameter of which is only slightly greater than the diameter of the spherical surface 73 of the bearing 71.

A resilient wiper seal 89 is supported by the edges 79, 87 to be in sliding, wiping contact with the surface 73. As described in further detail below, such construction permits the device 12 to accommodate articulating, oscillating movement of the joint 19 while yet sealing against the spherical surface 73 to obstruct entry of dirt. A resilient scraper seal 91 is retained between the edges 81, 85 and during oscillating movement, slides across the outer face 47 of the retaining plate 41, scraping dirt from it.

It is important that the device 12 be able to move with respect to the member 23 and the retaining plates 41 (to accommodate articulating and oscillating motion) while yet retaining its dirt-obstructing integrity. Referring further to FIGS. 1 and 2A, seal 89 is installed within the inner edge 79 of plate 75. The device 12 is mounted by an annular, scalloped retaining ring 93 having bolt holes 95 which are in registry with the enlarged holes 77 in the lower panel 75. Mounting is by stacking the panel 75 and the retaining ring 93 so that when the cover 83 is in place, the ring 93 is between the panel 75 and the cover 83.

Prior to installing bolts 97, spacers 99 are positioned between the ring 93 and the outer face 47 of the retaining plate 41 and in registry with each bolt 97. Such spacers 99 have a thickness slightly greater than the thickness of the lower panel 75. Preferably, such difference in thickness is about 0.031–0.032 inches. When the panel 75, spacers 99 and ring 93 are positioned as described, the bolts 97 are inserted through the ring 93, the spacers 99, the holes 77, the plate 41 (in that order) and threaded into the member 23 for secure attachment of the device 10 and plate 41. After attachment as described and after the seals 89, 91 are installed, the cover 83 is mounted using fasteners 101. It is to be appreciated that each of the holes 77 in the lower panel 75 is very substantially larger than the diameter of a spacer 99. The reason for this difference is explained below.

Referring additionally to FIG. 2B, several new features of the device 12 will now be described. When 30 the improved lubrication device 12 is installed on a joint 19, it is contiguous with an annulus 103 partially defined by such device 12. And because there is slight clearance between the ring 93 and the panel 75, the panel 75 is capable of slight movement away from the outer face 47 to create a clearance 105 between the lower surface of the panel 75 and the outer face 47. As described below, such clearance 105 provides a path through which lubricant can flow.

Referring further to FIGS. 1, 2A and 2B, it is assumed that two devices 10 are installed on a pivot joint 19, one each above and below the member 23. After the machine is so assembled but prior to its shipment, the joint 19 must be lubricated as a step in preparing it for use when delivered to the customer. Accordingly, grease is injected through the fitting 63, the passage 61, the channel 65 and the passage 67 to propagate up, down and around the interface 39. With continued lubricant injection, grease flows out of the interface 39 and fills each annulus 103. With still further injection, the slight pressure created in the annulus 103 will "lift" the lower panel 75 as shown in FIG. 2B to open the clearance 105. Grease flows through the clearance 105 and through the holes 77 to fill the lubricant reservoir 107. To assure complete reservoir filling, the device 12 may also be filled through a removable plug 109 in the cover 83.

In operation and as the lubricant 111 is depleted from the interface 39, that lubricant 111 in the annulus 103 propagates into the interface 39. And as lubricant 111 is depleted from the annulus 103, it is replenished from the reservoir 107.

Figure 7:
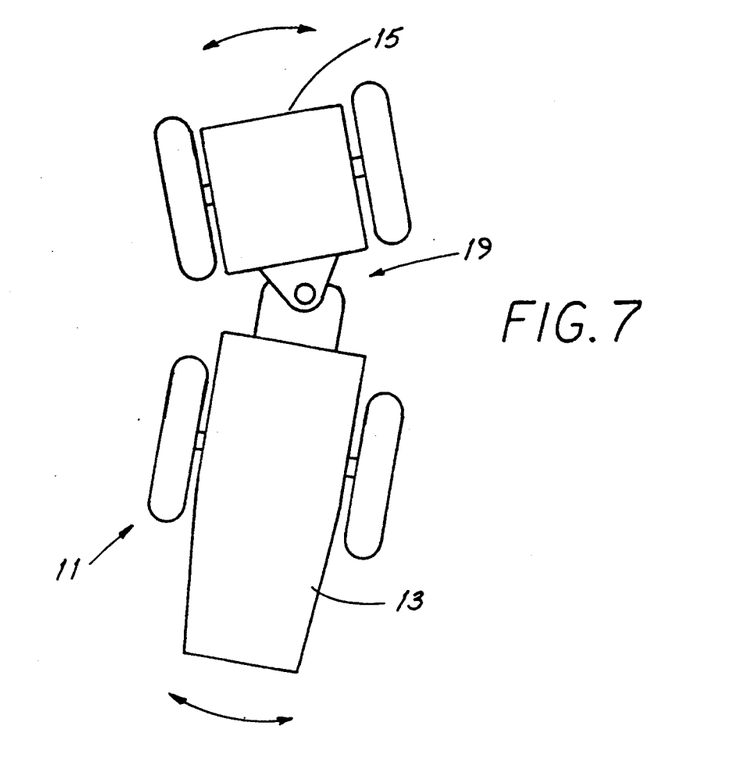
FIG. 7 is a simplified top plan view of the machine shown in FIG. 5 taken along the viewing axis VA-7 to illustrate articulating movement.
Figure 8:
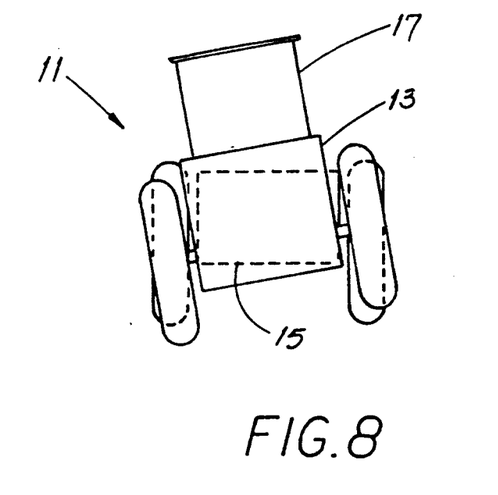
FIG. 8 is a simplified view of the machine shown in FIG. 5 taken along the viewing axis VA-8 to illustrate one type of oscillating movement.

FIG. 3 shows the relative device 12—joint 19 position for a machine sitting on a flat surface. That is, even though the frames 13, 15 may be angled in the same plane with respect to one another during articulating movement as shown in FIG. 7, they are not twisted with respect to one another. To state it another way, the machine may be experiencing articulating movement but not oscillating movement.

FIG. 4 illustrates the relative device 12—joint 19 position when the machine experiences a type of oscillating motion. It will be noted that each device 12 is tilted with respect to the joint axis 113 but nevertheless maintains sealing engagement with a secondary bearing 71. The device 12 thereby continues to lubricate the joint 19 and obstruct dirt entry even during oscillating motion. It is to be appreciated that oscillating motion may take any (or a combination) of several forms, all of which are characterized by relative movement of the frames 13, 15 in other than the same plane.

It will also be noted that the device 12 exhibits sliding motion with respect to a plate 41 and the position of the scraping seal 91 has changed with respect to such plate 41. Sliding, scraping movement of the seal 91 across the outer face 47 of a plate 41 helps scrape dirt so as to fall away from the joint 19 rather than working its way into the joint 19.

While the principles of this invention have been described in connection with specific embodiments, it should be understood clearly that these descriptions are made only by way of example and are not intended to limit the scope of the invention.

I claim:

1. In a structure for lubricating a pivot joint of the type permitting relative oscillating, articulating, non-rotating motion of connected members one to the other and having a primary bearing with a spherical load-bearing external surface, the improvement comprising:
a generally spherical secondary bearing adjacent to and outside of the primary bearing;
an annular hollow, disc-like device in sliding, sealing engagement with the secondary bearing and having a lubricant reservoir within the device;
a lubricant flow path extending from the device toward the external surface of the primary bearing, wherein the surface is lubricated and entry of dirt thereto is obstructed.

2. The improved structure of claim 1 wherein:
one of the members includes a cavity and a generally cylindrical race circumscribing the primary bearing and confined in the cavity by a pair of retaining plates;
each retaining plate has an outer face; and,
the annular lubricating device is mounted in sliding relationship to the outer face of the retaining plate, thereby accommodating oscillating movement while yet obstructing the entry of dirt.

3. The improved structure of claim 2 including a lower panel adjacent to the reservoir and secured by a ring with slight clearance between the ring and the lower panel to permit sliding panel movement.

4. The improved structure of claim 3 wherein the lower panel has holes therethrough, the device includes spacers, the ring is attached by bolts extending through the holes and the holes are substantially larger than the spacers, thereby facilitating sliding movement.

5. The improved structure of claim 3 wherein the joint includes a bearing-race interface and a retaining plate having an outer face and such clearance permits panel movement away from the face, thereby enabling lubricant to flow between the device and the interface.

6. The improved structure of claim 5 wherein panel movement away from the face provides a path through which lubricant flows for filling the device.

7. The improved structure of claim 1 wherein the joint includes a bearing-race interface and the device is contiguous with an annulus in lubricant-transferring relationship to the interface whereby lubricant confined in the annulus lubricates the interface.

8. The improved structure of claim 7 wherein lubricant confined in the device replenishes lubricant depleted from the annulus.

9. The improved structure of claim 8 wherein lubricant is injected through a path to fill the device and the path includes the annulus.

10. The improved structure of claim 9 wherein the joint includes a retaining plate, the device is mounted to provide slight clearance between the device and the plate and the injection path to the device includes the device plate clearance.

11. The improved structure of claim 10 wherein the device includes an auxiliary fill port through which lubricant may be introduced.

12. The device of claim 1 wherein the joint includes a retaining plate and the device includes a scraper seal in sliding engagement with the retaining plate, thereby cleaning the plate during oscillatory joint motion.

* * * * *